A. D. COLE.
TRACTION ENGINE.
APPLICATION FILED APR. 2, 1917.

1,372,338.

Patented Mar. 22, 1921.
4 SHEETS—SHEET 2.

INVENTOR
Arthur Dennis Cole
BY
Townsend & Decker
ATTORNEYS

A. D. COLE.
TRACTION ENGINE.
APPLICATION FILED APR. 2, 1917.

1,372,338.

Patented Mar. 22, 1921.
4 SHEETS—SHEET 4.

INVENTOR
Arthur Dennis Cole
BY
Townsend Decker
ATTORNEYS

UNITED STATES PATENT OFFICE.

ARTHUR DENNIS COLE, OF ST. PAUL, MINNESOTA, ASSIGNOR, BY MESNE ASSIGNMENTS, TO EDWIN RUTHEVEN CAMPBELL, OF NEW YORK, N. Y.

TRACTION-ENGINE.

1,372,338.   Specification of Letters Patent.   Patented Mar. 22, 1921.

Application filed April 2, 1917. Serial No. 159,160.

*To all whom it may concern:*

Be it known that I, ARTHUR DENNIS COLE, a citizen of the United States, and a resident of St. Paul, in the county of Ramsey and State of Minnesota, have invented certain new and useful Improvements in Traction-Engines, of which the following is a specification.

This invention relates to traction engines and consists in the provision of means for automatically stopping the tractor when the attempt is made to turn it too abruptly with relation to the vehicle or implement being drawn by it.

The invention consists further in details of construction and combinations of parts hereinafter more particularly described and claimed.

In the drawings illustrating my invention in one of its forms,—

Fig. 5 is a detail of the clutch shifting mechanism.

Figure 1:
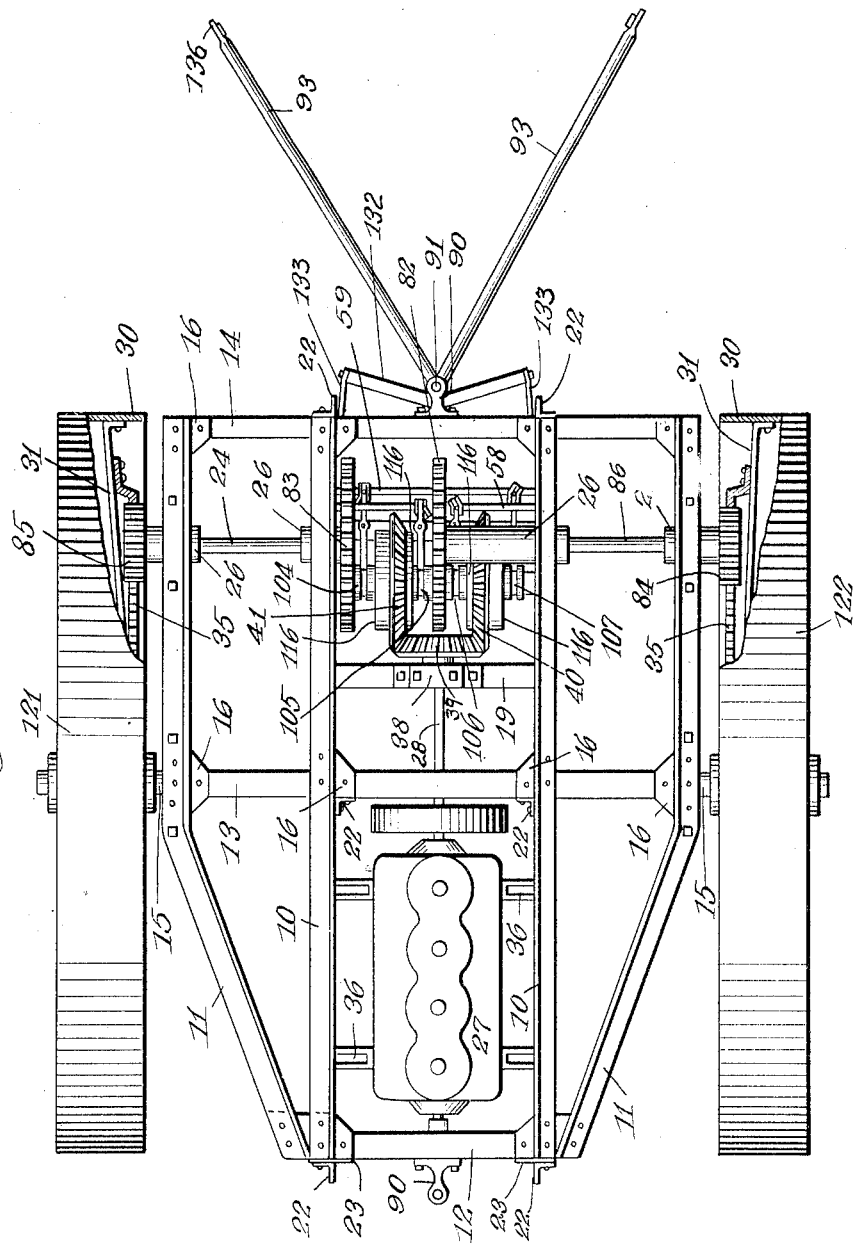
Figure 1 is a plan view of a traction engine embodying my improvements.

The frame of the tractor carrying the driving motor and transmission system between the motor and the drive wheels is suspended from the drive wheels and is constructed if desired from angle iron bars or plates riveted or otherwise secured together. The upper horizontal part of the frame comprises two straight longitudinal members 10 and two bent longitudinal members 11; also transverse members 12, 13 and 14. These members are fastened together by means of riveted plates 16. The lower horizontal part of the frame comprises the two longitudinal members 17, and transverse members 18, 19 and 20, suitably held together. Vertical members 22 and plates 23 unite the upper and lower parts.

A wheel axle 15 and a pair of countershafts 24, 86 are journaled in bearings 25 and 26 supported from the members 10 and 11 of the frame. Motor 27, motor shaft 28 and transmission shaft 29 are journaled in the lower part of the frame.

Drive wheels 121 and 122 of the tractor, two in number, support the machine from opposite sides and are capable of rotating independently of one another in either direction. They may consist of rolled rim 30, bar spokes 31 and a cast hub 32. They are journaled on shaft 15 and held against axial movement by collars 33 fastened to the shaft. Axle 15 is mounted in bearings 25 attached to members 11 of the frame. Power may be applied to the wheels through internal gears 35 bolted to the spokes 31.

Engine 27 is located below and in front of the axle to counterbalance the transmission machinery which is located at the rear. The engine is bolted to the frame by lugs 36. Shaft 28 has an additional bearing 38 on member 19 of the frame and terminates in bevel gear 39 geared to the transmission system now to be described.

Figure 4:
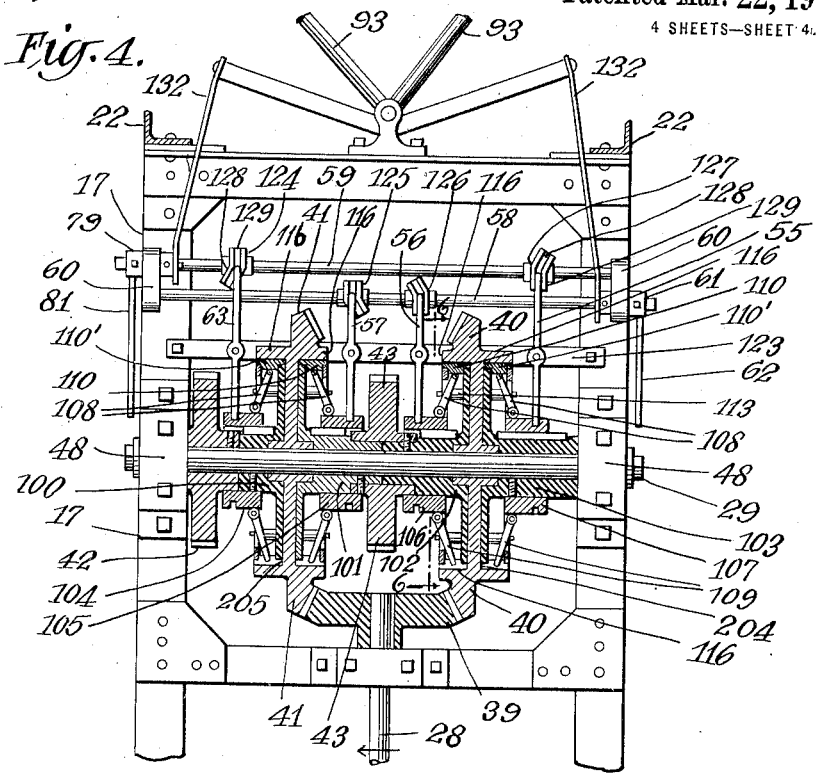
Fig. 4 is a sectional plan view showing the transmission mechanism in detail.
Figure 6:
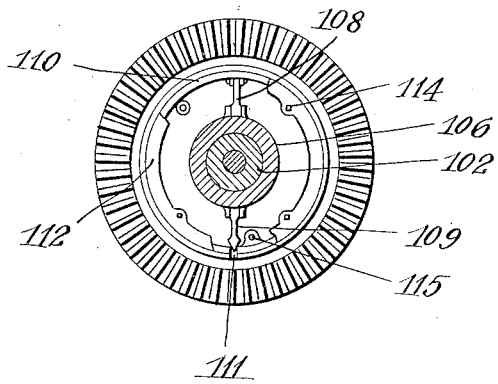
Fig. 6 is a section on line 6—6 of Fig. 4.

As best shown in Fig. 4, a pair of bevel gears 40 and 41 are rotatably mounted upon transverse transmission shaft 29 and mesh continuously with the bevel gear 39. Shaft 29 is journaled in bearings 48 bolted to the frame members 17 and carries a plurality of flanged sleeves 100, 101, 102 and 103, which ride up against the disk shaped webs 204 and 205 of the bevel gears 40 and 41. Sleeves 100 and 103 are fastened to said shaft while sleeves 101 and 102 are loose upon it. The sleeves carry grooved sliding collars 104, 105, 106 and 107. Each collar has a spline connection with the sleeve on which it is mounted and each is provided with a pair of oppositely extending pivoted arms 108 and 109, (Figs. 4 and 6).

Clutches or clutch sets, one set for each tractor wheel, may be constructed and operated independently of one another as follows, to secure the desired independence of drive and reversible drive of the tractor wheels. The clutch member for one clutch of a set and the manner of connecting and operating it from collar 106 will be described, the remaining clutches or clutch members of the two sets being substantially identical in construction. Referring to Fig. 6, arm 108 is pivoted to an externally expanding clutch ring 110 split at 111 and adapted at that point to receive the head of the other arm 109. Ring or clutch member 110 is rabbeted and rides on the periphery of the flange of sleeve 102 and on an annular plate 112 bolted to a number of bosses 113 on said flange by bolts 114. Ring or clutch member 110 is positioned within a clutch drum 116 formed on gear 40 and is itself pivoted to said flange at 115 as shown in Fig. 6 near one end of said ring. The arms 108 and 109 as indicated in Fig. 4 are normally obliquely positioned. As collar 106 is forced inward toward the web 204 of gear 40 the ring 110 is caused to expand and grips the clutch drum 116 thus connecting the sleeve 102 with the gear 40. Four such clutches 110, 110, 110′ and 110′ are employed, each being respectively controlled by the collars 104, 105, 106 and 107. The two ring clutches 110, 110 and coöperating parts 116 constitute a clutch or clutch set through which one of the tractor wheels is driven while the two clutch rings 110′, 110′ and coöperating parts similarly control the drive of the other tractor wheel through gearing as will be now described.

Upon the central portions of sleeves 101 and 102 is situated a spur gear 43 which is rigidly secured to both of said sleeves and which together with said sleeves can travel idly upon shaft 29. At the extreme end of shaft 29 is situated a gear 42 which is similar to gear 43 and is pinned to said shaft. Sleeves 100 and 103 being pinned to shaft 29, turn with said shaft and gear 42. Gear 43 meshes with a gear 82 fast on the end of the shaft 86 journaled in bearings 26 supported from the frame members 10. Shaft 86 further supports a bull pinion 84 which meshes with the internal gear 35 driving the wheel 122. Gear 42 in turn meshes with a gear 83 secured to shaft 24 which is also journaled in bearings 26 in alinement with the shaft 86. Similarly a bull pinion 85 secured to the end of shaft 24 meshes with the internal gear 35 to drive the other wheel 121. In this manner a separate drive is effected for each wheel. By properly operating the two clutch sets together or independently of one another the tractor wheels can be driven together either forward or backward, or either can be turned in either direction independently of the other. By this means the tractor can be guided to the right or the left or backed up, or may be even caused to turn on its own center by driving one wheel in one direction and the other in the opposite direction.

Figure 2:
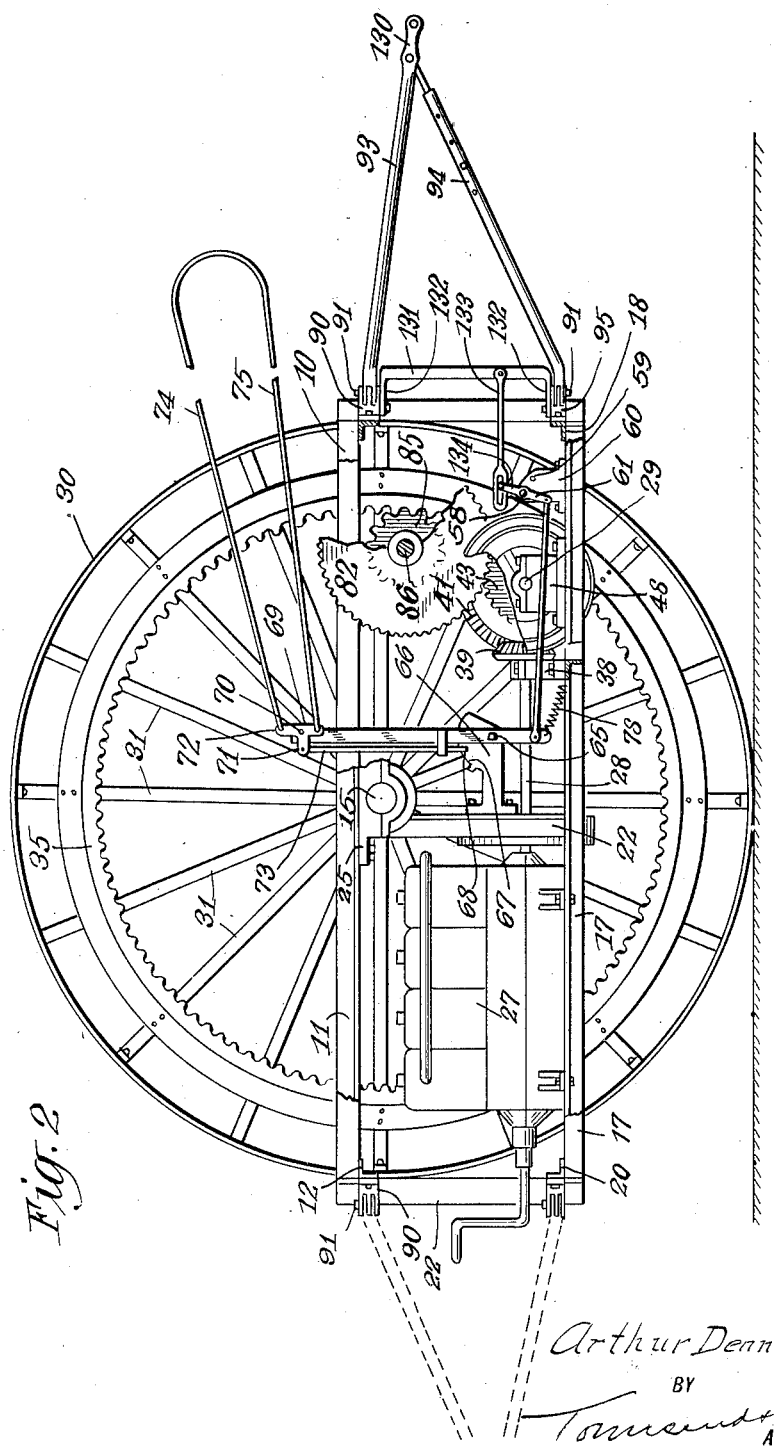
Fig. 2 is a side elevation of the same.
Figure 3:
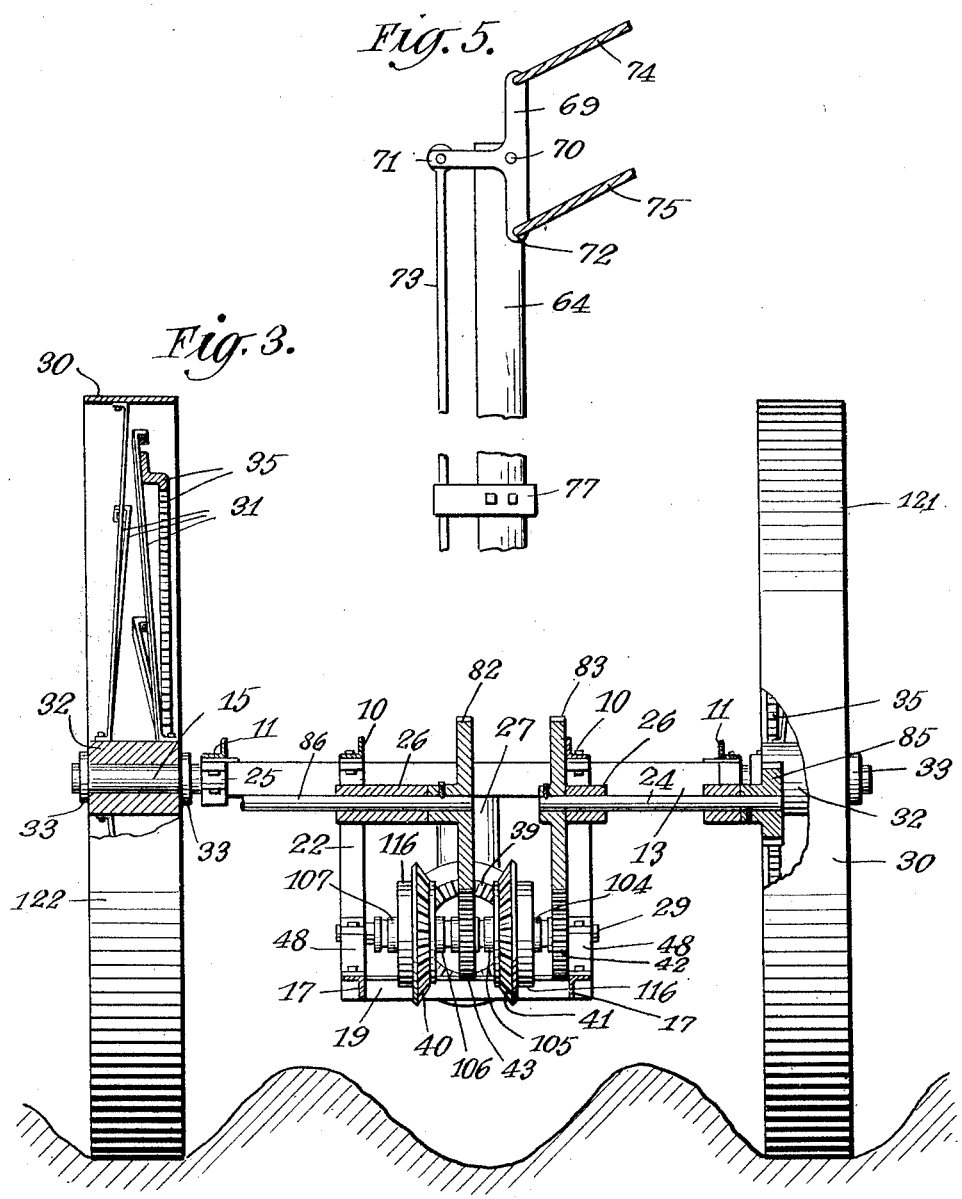
Fig. 3 is a part sectional elevation through the drive shaft for the wheels.

The devices for controlling and operating the clutches are best shown in Figs. 2 and 4. A bar 123 is positioned rearward of the transmission shaft 29 and is secured to the lower frame members 17. A number of levers 55, 56, 57 and 63 are pivoted to said bar and are adapted to engage the peripheral grooves on collars 107, 106, 105 and 104 respectively to operate the corresponding clutches. In close proximity to the ends of these levers are journaled a pair of rocking shafts 58 and 59 in bearing blocks 60 secured to the frame members 17. Shaft 58 operates on the clutch set 110, 110 for one of the tractor wheels and shaft 59 upon the clutch set 110′, 110′ for the other tractor wheel. These shafts are provided with grooved cams 124, 125, 126 and 127 which engage the ends of the levers 63, 57, 56 and 55 to operate the same. The cam grooves are spiraled at 128 and are circular at 129. As the shaft oscillates the circular part holds the clutch out of engagement and the spiral part throws it into engagement. Bell crank 61 attached to end of shaft 58 is connected by a link 62 to a lever 64. Bell crank 79 attached to shaft 59 is connected by a link 81 with a similar lever. Shaft 58 operates both clutches of the set 110 and 110, throwing one in and holding the other out of engagement when rocked in one direction and performing the reverse when rocked in the other direction. Hence gear 43 and consequently wheel 122 can be made to travel forward when shaft 58 is rocked in one direction and rearward when it is rocked in the other direction. The rocking of shaft 59 operates to drive the wheel 121 through the clutch set 110′, 110′ in a similar way.

Fig. 5 shows part of the catch lever 64 and catch attached thereto. As shown in Fig. 2, catch lever 64 is pivoted at 65 on a bracket 66, said bracket being bolted to the member 22 of the frame and provided with a segment 67 having a catch notch 68. Catch lever 64 carries at its upper extremity a T lever 69 pivotally mounted on lever 64 at 70 and pivotally attached to the catch rod 73 at 71, also having ropes 74 and 75 attached thereto. Rope or line 75 is attached at 72 and line 74 is attached to a similar point at the other end of the lever. Catch rod 73 slides up and down in a slot in casting 77 bolted to lever 64 and engage in the notch 68 of segment 67. Catch lever 64 projects beyond its point of pivot 65 to carry the link 62 and retractor spring 78.

The complete control of the tractor is effected through the right and left hand ropes 74 and 75 as follows, terminating in hand loops, as shown in Fig. 2. The operator can sit on a seat on the rear of the tractor, or on the vehicle or machine drawn or pushed, or he can walk on the ground. To operate the levers 64 he pulls the ropes 74 more than ropes 75, and so moves the T lever 69 and catch rods 73 so as to disengage the catches from the notches 68. Springs 78 then draw levers 64 away from the operator. By slackening or pulling ropes 74 and 75 he can adjust said levers to their forward positions to drive the tractor forward or to their central positions or can hold them in their backward positions if he wishes to back the tractor. When the lever 64 is in its forward position bell crank 61 is positioned so that lever 56 engages clutch member 110 of one set with the clutch element 116 of gear wheel 40. If the engine shaft 28 has the direction of rotation shown by the arrow in Fig. 4, the left hand tractor wheel is caused to turn in a forward direction, which rotation can be traced through the gear train 39 to 40, 43 to 82, 84 to 35, as is well shown in Fig. 2. When the lever 64 is in the rear position the other clutch member 110 of the same set, which is also connected with gear 43, engages with the clutch member of gear 41 and hence causes the left hand wheel to revolve backward. In the central position of the lever 64 neither clutch of the same set is engaged and the wheel stands still. In the same way gear 42 may be caused to rotate together with either gear wheel 40 or 41 through the sleeve on shaft 29 by operation of the clutch set 110', 110'. The shifting of arms 55 and 63 by shaft 59 produces the forward and reverse rotation of the right hand wheel or disconnects it, in an identical manner with the left hand wheel. It will be further noted that clutches 110 and 110 are shifted together and likewise clutches 110' and 110', so that there cannot be a locked condition of the mechanism and that further each wheel is independently controlled. In steering the operator manipulates the right hand ropes if he wishes to go to the right and the left hand ropes if he wishes to go to the left. It is obvious that the controlling device is similar in operation and in terminal construction to that used in the guidance of horses, a feature well appreciated by men accustomed to such forms of power. It is also readily seen that the controlling device has all the flexibility of the reins used with horses or other draft animals.

My invention provides a novel and effective drawbar which is well shown in Figs. 1 and 2. Slotted castings 90 and 95 are bolted to the upper and lower members 12, 14, 18 and 20 of the frame in their centers and are provided with holes through which pins 91 can be inserted. The drawbar proper comprises two upper members 93 and two lower members 94, the members 93 being hinged together to the pin 91 in casting 90 and the lower members hinged together to the pin 91 in casting 95. The upper and lower members on one side are hinged together and provided with an eye 130, and the members on the other side are also hinged together and provided with an eye 136 by means of which the drawbar can be connected at two points in a horizontal plane to the object drawn. It will hence be seen that these members can be spread or moved laterally so that the drawbar members may be spaced any width to adapt the same to any device which it is desired to draw. The lower members 94 are preferably made adjustable in length, so that the height of the hitch may also be varied. By reversing the drawbar, as shown in dotted lines in Fig. 2, the range of adjustment of height can be altered from a high hitch to a low hitch.

To prevent injury to the tractor or machine drawn or the connections between them from the attempt to turn the tractor too abruptly, I provide suitable means for automatically stopping the tractor when they are brought into such relative position by the turning of the tractor that continuation of the turning movement would lead to breakage or injury. To this end I provide suitable means for automatically stopping the tractor preferably by throwing out the drive clutches through a connection between the same and parts carried by or attached to the vehicle or implement being drawn. The drawbar may be conveniently employed for this purpose through suitable connections with the rocking shafts which operate the clutches. A closed rectangular member comprising vertical pieces 131 and horizontal pieces 132 is pivoted at the centers of the horizontal pieces to the castings 90 and 95. The pieces 132 are preferably bent outward from the tractor frame and the whole structure is adapted to oscillate on its pivots. The vertical pieces 131 are pivotally connected by means of slotted links 133 with upwardly extending cranks 134 secured to the shafts 58 and 59. When said device is symmetrically disposed, shafts 58 and 59 are permitted to oscillate freely to control the tractor. When, however, the tractor has turned to such an extent that the drawbar engages the vertical side pieces 131, the device is oscillated and the cranks 134 manipulated. In such cases the clutches operating to drive the wheels will be thrown out of engagement, thus stopping the tractor. It will become evident that if the slots in links 133 are made the correct length, the device will operate to throw from reverse to neutral on one wheel and on the other wheel to throw from forward to neutral. In this way it is impossible to cause accident or to mutilate the traction engine.

What I claim as my invention is:—

1. A traction engine comprising a pair of driving wheels, a frame supported on said wheels, a drawbar pivoted to said frame, an engine situated on the frame, means to independently drive each wheel in either direction to steer the tractor, means for rendering said driving means inoperable and operating devices therefor adapted to be engaged with the drawbar when the tractor has turned through a predetermined angle thereto.

2. A traction engine comprising a pair of driving wheels, a frame supported on said wheels, a drawbar pivoted to said frame, an engine situated on the frame, a transmission system including a plurality of clutches for independently driving each of said wheels in either direction, a rocking member engageable by the drawbar and connected with said clutches for throwing the same out of engagement when the tractor has turned through a certain predetermined angle relative thereto.

3. A tractor having a drawbar pivotally connected therewith and combined with means for stopping the tractor operable by said drawbar when the tractor is turned to a predetermined angle relative to said drawbar.

4. A traction engine having independently driven wheels at opposite sides of the frame and means for controlling the drive of said wheels to steer the engine, combined with a drawbar pivotally connected to the engine and means adapted to render the driving means inoperable and operative by the drawbar when the tractor is turned to a predetermined angle relative to the drawbar.

5. A traction engine having a pair of driving wheels located respectively at opposite sides of the frame and clutches for connecting or disconnecting the wheels independently of one another with the drive motor for steering the engine, and a drawbar operatively connected with the clutches for throwing them out of action when the tractor is turned to a certain predetermined angle relative thereto.

6. The combination with a tractor having means for disconnecting its driving motor from the drive wheels, of a pivoted member adapted to connect the tractor with a vehicle being drawn and means operable by said pivoted member for acting on said disconnecting means when the angle of draft exceeds a predetermined angle.

7. The combination with a tractor and means for stopping the progress of the same, of means for automatically bringing said stopping means into action when the angle of draft exceeds a predetermined angle.

8. In a traction engine, the combination of independently rotatable drive wheels, a driving motor constantly geared to two reversely rotating clutch members, a shaft supporting said clutch members, clutch operating sleeves supported by said shaft and axially movable thereon, expansion clutches, two for each reversely operating clutch member, and two rocking shafts having operating cams operatively connected with said sleeves and coöperating therewith to actuate the same in pairs and independently of one another to bring the clutches of a pair into operative engagement with one or the other of said oppositely rotating clutch members or to disconnect both clutches therefrom in the three several positions respectively of said rocking shafts.

9. In a traction engine, the combination with a traction wheel, of a shaft geared to said wheel, a drive gear for said shaft, two oppositely driven wheels, a shaft upon which the same rotate, two expansion clutches coöperating with said oppositely driven wheels, a lever and actuating sleeve for each expansion clutch supported on the shaft of the gear wheel and capable of axial movement thereon, said sleeve being operatively connected with said drive gear, and means for actuating said sleeves in concert to engage either one of said expansion clutches with its wheel, the other being disconnected, or to disconnect them both as and for the purpose described.

10. Means for operating the clutch sleeves in the construction specified in claim 9, said means comprising a pair of levers and rocking cams one for each wheel mounted upon a common rock shaft, said cams having spiral and circular portions disposed to produce the clutch action set forth.

11. The combination of a traction engine and the clutches connecting the drive wheels thereof with the drive motor, of actuating devices for said clutches having connection with the same through devices having lost motion, said actuating devices being operatively connected with the vehicle or implement being drawn when the tractor has turned to a predetermined extent with relation to the vehicle or implement drawn.

12. In a traction engine, the combination of a clutch through which the traction wheel is operatively connected with the drive motor for the engine, a rock shaft provided with a cam operatively connected with said clutch and slotted links connecting the drawbar of the tractor with said rock shaft whereby the rock shaft may be manually operated without interference from the drawbar and may be operated by said drawbar when the angle of the line of draft exceeds a predetermined amount.

13. In a traction engine, the combination of means for disconnecting the drive wheel and drive motor, a drawbar and a slotted link operatively connecting the drawbar with the means for disconnecting the drive wheel.

Signed at Toronto, Canada, in the county of York and Province of Ontario, this 27th day of March, A. D. 1917.

ARTHUR DENNIS COLE.

Witnesses:
 THOMAS L. POOLE,
 H. J. MARTIN.